United States Patent [19]
Le Strat et al.

[11] Patent Number: 6,134,220
[45] Date of Patent: *Oct. 17, 2000

[54] METHOD OF ADAPTING THE AIR INTERFACE IN A MOBILE RADIO SYSTEM AND CORRESPONDING BASE TRANSCEIVER STATION, MOBILE STATION AND TRANSMISSION MODE

[75] Inventors: Evelyne Le Strat, Paris; Marc Delprat, Le Chesnay, both of France

[73] Assignee: Alcatel CIT, Paris, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/727,429

[22] PCT Filed: Apr. 7, 1995

[86] PCT No.: PCT/FR95/00449

§ 371 Date: Oct. 11, 1996

§ 102(e) Date: Oct. 11, 1996

[87] PCT Pub. No.: WO95/28814

PCT Pub. Date: Oct. 26, 1995

[30] Foreign Application Priority Data

Apr. 13, 1994 [FR] France ................................. 94 04396

[51] Int. Cl.⁷ .............................. H04Q 7/38; H04B 7/26; H04L 1/12
[52] U.S. Cl. ......................... 370/252; 370/328; 370/468; 455/517; 455/69
[58] Field of Search ..................................... 370/252, 253, 370/328, 329, 331, 332, 333, 468, 337, 347, 442, 465, 466; 455/436, 63, 69, 500, 501, 502, 517, 67.1, 67.3

[56] References Cited

U.S. PATENT DOCUMENTS

| | | | |
|---|---|---|---|
| 5,142,551 | 8/1992 | Borth et al. | 375/219 |
| 5,327,576 | 7/1994 | Uddenfeldt et al. | 370/333 |
| 5,404,355 | 4/1995 | Raith | 370/311 |
| 5,490,136 | 2/1996 | Sereno et al. | 370/468 |

FOREIGN PATENT DOCUMENTS

| | | |
|---|---|---|
| 0333679A1 | 9/1989 | European Pat. Off. . |
| 0399612A2 | 11/1990 | European Pat. Off. . |
| 0423485A1 | 4/1991 | European Pat. Off. . |
| 0472511A3 | 2/1992 | European Pat. Off. . |
| 0627827A2 | 12/1994 | European Pat. Off. . |
| WO 94/07313 | 3/1994 | WIPO . |

OTHER PUBLICATIONS

Source and Channel Coding for Speech in Marocell/Mcrocell/Picocell Third Generation Systems, by Tomas Sanjuan, Luis Hernandez and Jose Manuel Paez, Fourth Winlab Workshop on Third Generation Wireless Information Networks in cooperation with IEEE Vehicular Technology Society, Oct. 19–20, 1993, pp. 175–195.

Speech Coding Requirements From the Perspective of the Future, Mobile Systems, Marc Delprat, et al., IEEE Workshop on Speech Coding for Telecommunications.

Primary Examiner—Ricky Ngo
Attorney, Agent, or Firm—Sughrue, Mion, Zinn, Macpeak & Seas, PLLC

[57] ABSTRACT

A mobile radio system enables exchange of bidirectional digital signals between at least one mobile station and at least one base transceiver station and provides at least two coding modes, each mode corresponding to a predetermined source code and a predetermined channel code for the transmission of a wanted signal for each transmission direction. Each source code corresponds to a given user bit rate and each channel code corresponds to a given coding efficiency and therefore to a given total bit rate for a given source code. For adaptation of the air interface of this system, at the time of a call between a mobile station and a base transceiver station, two separate analyses of transmission quality are carried out for each transmission direction, respectively, and, for each transmission direction, one of the coding modes is selected in accordance with the corresponding transmission quality analysis.

14 Claims, 8 Drawing Sheets

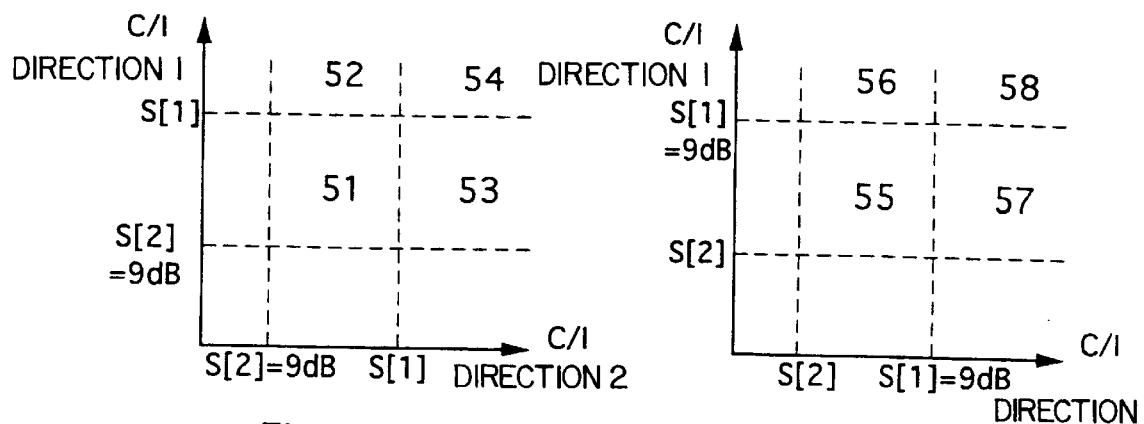
Fig. 5A
Fig. 5B
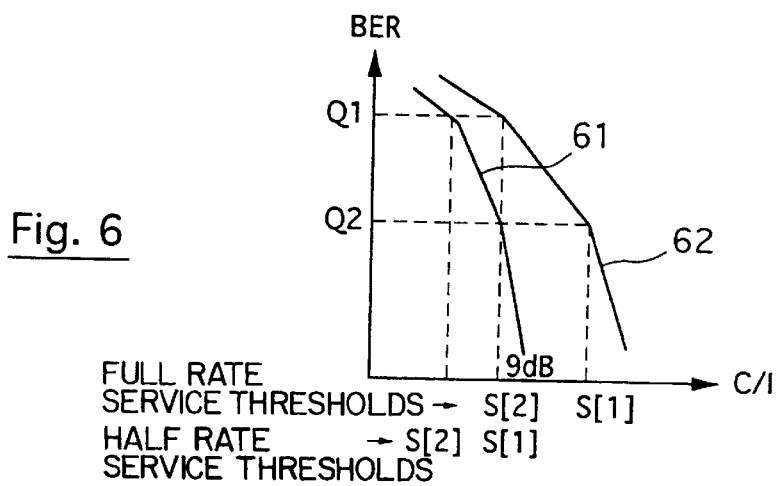
Fig. 6
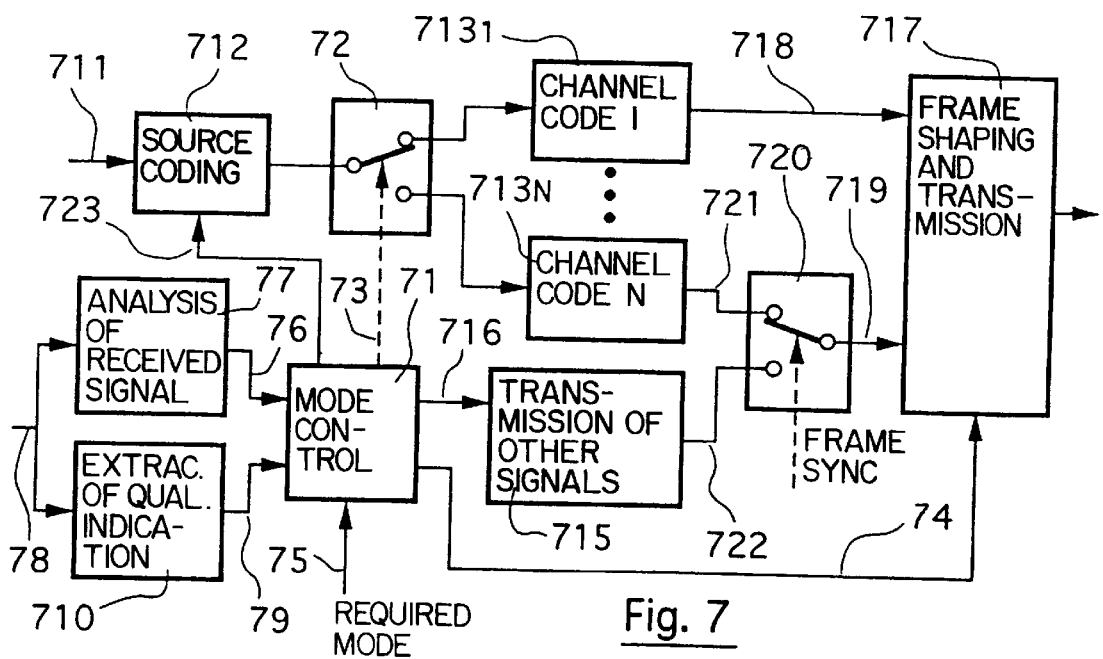
Fig. 7

METHOD OF ADAPTING THE AIR INTERFACE IN A MOBILE RADIO SYSTEM AND CORRESPONDING BASE TRANSCEIVER STATION, MOBILE STATION AND TRANSMISSION MODE

BACKGROUND OF THE INVENTION

1. Field of the Invention

The field of the invention is that of digital mobile radio systems. The invention applies in particular to cellular mobile radio systems such as systems conforming to the GSM (Global System for Mobile communications) standard, for example.

More particularly still, the invention concerns the exchange of digital signals, whether they constitute data or speech, in time-division multiple access (TDMA) time-division multiplex systems.

2. Description of the Prior Art

The TDMA technique divides time into frames of fixed and predetermined duration, the frames being in turn divided into time slots. Each call is associated with one or more time slots.

Thus a frame comprises N time slots that can correspond to N calls. Each receiver is able to extract the time slots addressed to it in order to reconstitute the source signal. In this way N calls can be transmitted in the same frequency band.

Where data communications are concerned, mobile radio systems like the GSM system conventionally provide two services, corresponding to two different, levels of quality. Thus, for transmission of data, the GSM system provides a first data communication mode called the full rate mode, in which a time slot is transmitted in each frame, and a second transmission mode called the half rate mode, in which the data signal is transmitted in one time slot only every two frames, on average.

In this second mode, the resource allocated to a call is halved compared to the first mode. This frees up resources for other calls.

This halving of the total bit rate of the call naturally requires modification of the channel coding used, to retain the same user bit rate, in other words, the half rate mode corresponds to channel coding with half the yield of that of the full rate mode. In the GSM system, the two modes respectively correspond to raw bit rates of 11.4 kbit/s and 22.8 kbit/s.

Consequently, the efficacy of half rate channel coding is less than that of full rate channel coding. For this reason the half rate mode can be used only when transmission conditions are good and/or the transmission quality required is average, in other words when a relatively high bit error rate can be tolerated. If the transmission channel is subject to interference and/or the data requires a higher transmission quality (i.e. a lower bit error rate) the full rate mode must be used.

According to the GSM standard, a transmission mode is chosen at the time the call is set up and is retained throughout the call. This technique has two drawbacks:

- if the service in question requires a transmission quality corresponding to the use of the half rate mode under normal conditions of operability and if the half rate mode is adopted, should the channel then be subjected to a higher level of interference, exceeding the operability limit of the system (set at a C/I value of approximately 9 dB), the call in progress is suddenly cut off; under difficult coverage conditions a value of C/I below 9 dB may be encountered;
- if the service in question requires a transmission quality corresponding to the use of the full rate mode under normal conditions of operability and if the full rate mode is adopted, should the channel subsequently be subject to a lower degree of interference, the channel coding employed is of higher quality than is required; the transmission channel is therefore unnecessarily occupied in alternate frames (causing unnecessary interference in neighboring cells).

In mobile radio systems these problems are major problems since the transmission channel changes continually with the movement of the mobile station and the movement and the activity of the sources of interference, etc. As a result, the full rate mode is usually chosen, for safety, and this leads to high and often unnecessary consumption of the transmission resource.

There are also two configurations in the case of speech signals (full rate mode and half rate mode), which correspond to the use of different speech encoders (source coding) and different channel encoders, the two pairs of encoders (source and channel) providing respective raw bit rates of 22.8 kbit/s (full rate) and 11.4 kbit/s (half rate).

Problems similar to those described above for data are also encountered with speech.

A major objective of mobile radio system designers is to limit the quantity of data transmitted, for a number of reasons and in particular:

- to increase the number of calls in the multiplex;
- to reduce the transmission time (in the case of transmitting data);

. . .

To this end, U.S. patent application U.S. Pat. No. 5,327, 576 proposes modification of the mode of transmission used, during a call, on the basis of the measured bit error rate.

To be more precise, in the method described in the above application, the base transceiver station (the station managing all calls with mobiles in a given cell) measures the bit error rate of a given call and selects one or other of the transmission modes according to the measured error rate.

This technique improves transmission resource use. It has a number of drawbacks, however, that the novel technical approach of the invention clearly highlights. In particular, it is based on an analysis of the transmission channel as seen from the base transceiver station only (or from the mobile station only), which leads to non-optimum resource use, as will emerge below.

One object of the invention is to overcome these various drawbacks of the prior art.

To be more precise, one object of the invention is to provide a method of adaptation of the air interface (essentially corresponding to layers 1 (physical) and 2 (link) of the ISO model) in a mobile radio system that minimizes the occupancy of transmission channels by reducing the quantity of resource allocated to a call on average and by limiting interference induced by a call in neighboring cells.

This object of limiting interference is crucial in cellular mobile radio systems in particular. In these systems, the same frequency band is allocated to several geographically dispersed cells. Although the distribution of the cells is defined to maximize the distance between them, it is by no means rare for the signals of a given cell to suffer interference from those of other cells using the same band to a degree that is above an acceptable limit for the system.

In a cellular system, a maximum interference level enabling the specified transmission quality to be provided is usually fixed. An object of the invention is therefore to provide a method of the above kind whereby the specified transmission quality continues to be provided if the interference exceeds this maximum level.

An object of the invention is therefore to provide a method of the above kind in which the untimely cutting off of calls is reduced.

In other words, an object of the invention is to expand the range of operability of the system, in particular under difficult transmission conditions.

Another essential and primordial object of the invention is to provide a method of the above kind whereby the number of calls can be increased. In other words, an object of the invention is to reduce, on average, the resource used to transmit a service in order to increase the number of users in the system, i.e. the number of calls per cell.

In one particular embodiment of the invention, a secondary object of the invention is to provide a method of the above kind for transmitting asynchronous data easily and as fast as possible, in particular when it is not possible to free up the same resource in both communication directions.

Another object of the invention is to provide a method whereby the network infrastructure is simplified. In the conventional way, network planning must offer acceptable operability (C/I≈9 dB in the GSM system) everywhere (or over a certain portion of the area of each cell), which in some cases constitutes a very serious constraint.

An object of the invention is therefore to remove this constraint by widening the operability range (beyond 9 dB, for example in the case of the GSM system) to allow more efficient planning by reducing the number of sites.

Another object of the invention is to provide a method of the above kind that is equally applicable to speech signals and to data signals.

SUMMARY OF THE INVENTION

These objects, and others that will emerge hereinafter, are achieved in accordance with the invention by means of a method of adaptation of the air interface in a mobile radio system enabling exchange of bidirectional digital signals between at least one mobile station and at least one network entity such as a base transceiver station, and providing at least two coding modes, each mode corresponding to a predetermined source code and a predetermined channel code for the transmission of a wanted signal for each transmission direction, and each source code corresponding to a given user bit rate and each channel code corresponding to a given coding efficiency and therefore to a given total bit rate for a given source code, wherein, at the time of a call between a mobile station and a base transceiver station, two separate analyses of transmission quality are carried out for each transmission direction, respectively, and, for each transmission direction, one of said coding modes is selected in accordance with the corresponding transmission quality analysis.

The invention is based on a novel approach to the transmission channel, which is treated separately for each transmission direction. Transmission conditions can be very different for the two transmission directions. One reason for this is that the sources of interference are different. In the uplink direction, from the mobile station to the base transceiver station, the sources of interference are essentially the mobile stations moving in the co-channel cells; in the opposite, downlink direction, the sources of interference are neighboring base transceiver stations. The masking effects are therefore different.

The invention therefore optimizes three things:

the analysis of transmission conditions, which were previously viewed from one end only (generally the base transceiver station); it was therefore possible to regard as "good" a channel that was "bad" in the opposite direction, and vice versa; the invention presupposes feedback of quality information (in at least one direction) before a decision is taken;

the selection of the coding mode, which is selective for each transmission direction; and the encoding mode used, since the invention enables selective action at the source coding and/or channel coding level.

It should be noted that the approach adopted by the invention is in no way obvious in the light of the prior art techniques. Apart from the fact that it is based on a novel approach to the transmission channel, a number of modifications are required in order to put the invention into effect, in particular with regard to the exchange of information (measured quality and/or change of coding mode) between the two stations.

Some mobile radio systems, like the GSM system, allocate resources on a fixed basis, through at least two transmission modes corresponding to different transmission resources allocated to a call.

To be more precise, a transmission mode defines a coding mode/allocated resource combination. The transmission mode therefore corresponds to the use of a certain coding mode and the allocation of a certain resource. A coding mode can therefore correspond to a plurality of transmission modes.

In this case, in accordance with the invention, on the occasion of a call between a mobile station and a base transceiver station, one of said unidirectional transmission modes is advantageously selected for each transmission direction, uplink and downlink, in accordance with at least one of said transmission quality analyses and the quality required for said call, and possibly the traffic load.

In other words, a transmission mode is chosen when a call is initialized, corresponding to a required level of quality, for example. The invention enables the transmission mode to be changed during a call, corresponding to a change of coding mode, as soon as this is possible (changing to a mode that is less robust with respect to transmission errors, but offering a higher level of quality and/or a lower consumption of resources) or necessary (changing to a mode that is more robust with respect to transmission errors, but consuming more resources and/or enabling the service to be maintained at the cost of a slight reduction in quality, subject to constraints of availability, of course).

Various situations can be envisaged, according to whether the mobile radio system in question requires symmetrical allocation of resources for each transmission direction or not.

In the second case, which can be regarded as equivalent to two unidirectional calls, the principle can be very simple: the change of mode in one direction is effected as soon as the change of coding mode to a less robust, respectively more robust mode with respect to transmission errors is possible, respectively necessary. A change of the coding mode is necessary if the quality of the channel deteriorates. It is possible if the quality of the channel improves to the point that transmission quality can be maintained using a coding mode consuming less resource or increased if the resource already allocated is retained.

In the former case, which corresponds to the GSM system, for example, direct application always leads to the choice of identical coding modes for both directions. There is therefore a bidirectional transmission mode that corresponds to the use of the same unidirectional mode in both transmission directions. A change of bidirectional transmission mode is therefore effected if a change of coding mode (compatible with the transmission mode) is possible for both directions or necessary for at least one direction.

Thus, in a system in which said transmission modes correspond to an allocation of identical transmission resources in each of said transmission directions, a change of transmission mode to a transmission mode corresponding to a greater transmission resource is effected if at least one of the coding modes selected in at least one transmission direction corresponds to a total bit rate incompatible with the resource allocated in the current transmission mode and the additional transmission resource required is available (in which case the same coding mode is applied to both transmission directions, this coding mode being that of the two modes selected requiring the greater amount of the resource), and a change of transmission mode to a transmission mode corresponding to a lesser amount of transmission resourceis effected if coding modes consuming less resource are selected in both directions. A bidirectional transmission mode is then chosen corresponding to the use of the same coding mode in both directions, the latter mode being that of the two modes selected in each direction consuming the greater amount of the resource.

The same approach can be adopted for selecting between bidirectional transmission modes which are the same in terms of use of resource but different in terms of robustness.

The invention is naturally not limited to two coding modes or to two transmission modes. To the contrary, it is a simple matter to generalize the invention to n coding modes and m unidirectional transmission modes ($m \leq n$, it being possible for the same coding mode to correspond to a plurality of transmission modes). On the basis of n coding modes it is possible to define n bidirectional transmission modes for which the same coding mode is used in both directions.

In accordance with one important feature of the invention, at least one modified transmission mode is also defined, in which the coding modes used in the two directions are different.

Accordingly, in the situation in which there are n different unidirectional coding modes, it is possible to define:

n bidirectional transmission modes (known as primary modes) corresponding to the use of the same coding mode in both directions;

n(n−1) bidirectional transmission modes (known as secondary modes) corresponding to coding modes in both directions. Among these n(n−1) modes there may exist situations in which the raw bit rate is different and therefore corresponds to different required minimal resources in the two transmission directions (to be more precise, there are modified transmission modes of two types: modes with the same raw bit rate in both directions, and modes with asymmetric raw bit rates). If the system requires symmetrical resource allocation, the resource corresponding to the highest raw bit rate is allocated. The resource allocated to at least one of said transmission directions is therefore greater than the resource required to transmit the information coded in the corresponding coding mode, and said coded information is divided between a fraction of the time slots corresponding to said allocated resource.

This type of modified transmission mode is entirely novel. It is possible only because the invention provides a different approach to quality for each transmission direction. In the case of a bidirectional mode with asymmetric raw bit rates, it enables time slots to be freed up in one direction even if this is not possible in the other direction. Moreover, the invention is equally specifically concerned with a modified transmission mode of this kind.

Two strategies can be envisaged for time slots that are not used by said call:

either they do not carry any signal, which reduces interference with neighboring cells; if there is no transmission in a cell, the latter does not cause any interference in its neighbors, or they are allocated to the transmission of asynchronous data.

In one particular embodiment of the invention (intended in particular for adaptation of the current GSM standard for data communications), said transmission modes comprise:

a first (full rate) mode in which said data is transmitted at the rate of one time slot every signal frame, and a second (half rate) mode in which data is transmitted at the rate of one time slot every two signal frames.

In this case, a modified transmission mode advantageously consists in:

transmitting information coded in a first coding mode at the rate of one time slot every signal frame (full rate) in a first transmission direction, and transmitting information coded in a second coding mode at the rate of one time slot every two signal frames (half rate) in a second transmission direction, the resources allocated to the call in both transmission directions corresponding to the resource needed to transmit data in said first mode.

The analysis of transmission quality advantageously consists in determining at least one of the following:

the bit error rate (BER) of the received signal, the power of the received signal, the distance between the mobile station and the base transceiver station, an estimate of the impulse response of the transmission channel, the time alignment, the signal to noise ratio, the signal to interference ratio (C/I).

In one advantageous embodiment of the invention said selection of a coding mode allows additionally for at least one of the following:

a required level of quality for the call in progress, a required level of quality for at least one transmission direction and for the call in progress, a type of service conveyed by said call, the traffic load.

The selection of a coding mode preferably includes a step of comparing information representative of the transmission quality with at least one predetermined threshold, to be more precise with the same number of thresholds as coding modes.

Said quality information is advantageously compared with different thresholds according to the level of quality required for the call in progress, if there is more than one level of quality.

It is advantageous to define two sets each of at least one threshold, a first set being used when the measured transmission quality deteriorates and a second set being used when the measured transmission quality improves.

This avoids incessant changing of modes when the measured level is near a threshold (this is known as the "ping-pong" effect).

Said thresholds are preferably predetermined values of the signal to interference ratio (C/I).

In a preferred embodiment the decision to change coding mode and/or transmission mode is taken in said base transceiver station, said mobile station transmitting to said base transceiver station information representative of transmission quality in the base transceiver station to mobile station direction.

More generally, the method of the invention preferably includes a step of selecting between at least two source codes and/or a step of selecting between at least two channel codes.

Said selection of a coding mode is carried out in such manner as to limit the quantity of resource allocated in each transmission direction and/or to optimize transmission quality.

For example, a source code and a channel code may be chosen to maintain the current raw bit rate as far as possible, and therefore to offer the best possible transmission quality without modification of the resource, or to provide the best possible transmission quality subject to modification of the resource.

The invention also concerns a base transceiver station of a mobile radio system implementing the method as defined above. A base transceiver station of this kind advantageously comprises:

- means for determining at least a first indication representative of transmission quality in the mobile station to base transceiver station direction,
- means for receiving a second indication representative of transmission quality in the base transceiver station to mobile station direction,
- means for modifying the coding mode and/or the transmission mode in each transmission direction in accordance with said first and second indications, and
- means for transmitting to said mobile station information representative of the coding and/or transmission modes selected.

It also concerns a corresponding mobile station including:

- means for determining at least one indication representative of transmission quality in the base transceiver station to mobile station direction,
- means for transmitting said indication to said base transceiver station, and
- means for receiving an indication representative of the coding and/or transmission modes selected.

Other features and advantages of the invention will emerge from a reading of the following description of a preferred embodiment of the invention given by way of non-limiting illustrative example and from the accompanying drawings.

BRIEF DESCRIPTION OF THE DRAWINGS

FIGS. 4A and 4B show the principle of the decision to change mode according to the required level of quality for the call in progress and FIGS. 5A and 5B show the various corresponding operational possibilities.

FIG. 6 shows the variation in the bit error rate as a function of the ratio C/I, according to the required level of quality, and one possible determination of the threshold values from FIGS. 4A, 4B, 5A and 5B.

FIG. 7 shows a block diagram of the transmit part of a base transceiver station of the invention.

DETAILED DESCRIPTION OF THE PREFERRED EMBODIMENT

Figure 1:
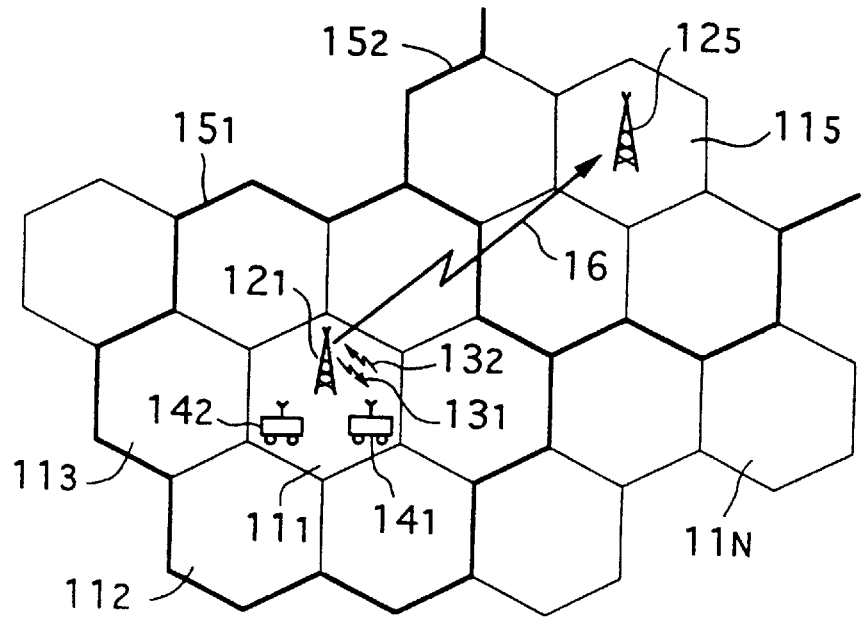
FIG. 1 is a diagrammatic representation of a type of cellular mobile radio network that is known in itself and in which the method of the invention may be used.

FIG. 1 is a diagrammatic representation of a type of cellular network that is known in itself. The geographical territory covered by the mobile radio system is divided into cells $11_1$ through $11_N$. Each cell $11_1$ includes a base transceiver station $12_1$ that can exchange signals $13_1$, $13_2$ with a plurality of mobile stations $14_1$, $14_2$ moving within said cell $11_1$.

Two neighboring cells $11_1$, $11_2$ use different frequency bands so that there is no interference between the signals transmitted in the two cells. To be more precise, the allocation of frequencies is based on an organization of the cells into patterns $15_1$, $15_2$ each of seven cells. Of course, the patterns (and likewise the cells) can be different shapes and the patterns can contain more than seven cells. The frequencies allocated within the same pattern are different. On the other hand, they are re-used from one pattern $15_1$ to the other $15_2$, for example, cell $11_5$ uses the same frequencies as cell $11_1$.

Consequently, the signals $13_1$, $13_2$ exchanged in the cell $11_1$ may cause interference 16 with the signals exchanged in the cell $11_5$. One object of the invention is to limit this interference (another essential objective being, of course, to increase the number of calls possible in each cell) by minimizing the exchanges $13_1$, $13_2$. If no signals $13_1$ or $13_2$ are transmitted, there is naturally no interference 16.

To achieve this, the main feature of the invention is control of the coding mode on the basis of a two-fold analysis of the transmission channel, the latter being considered independently for each transmission direction. In this way it is possible to limit the signals transmitted selectively for each transmission direction.

Taking another approach, this techniques makes it possible to free up resources to transmit more data or speech, and also to optimize transmission quality.

Figure 9:
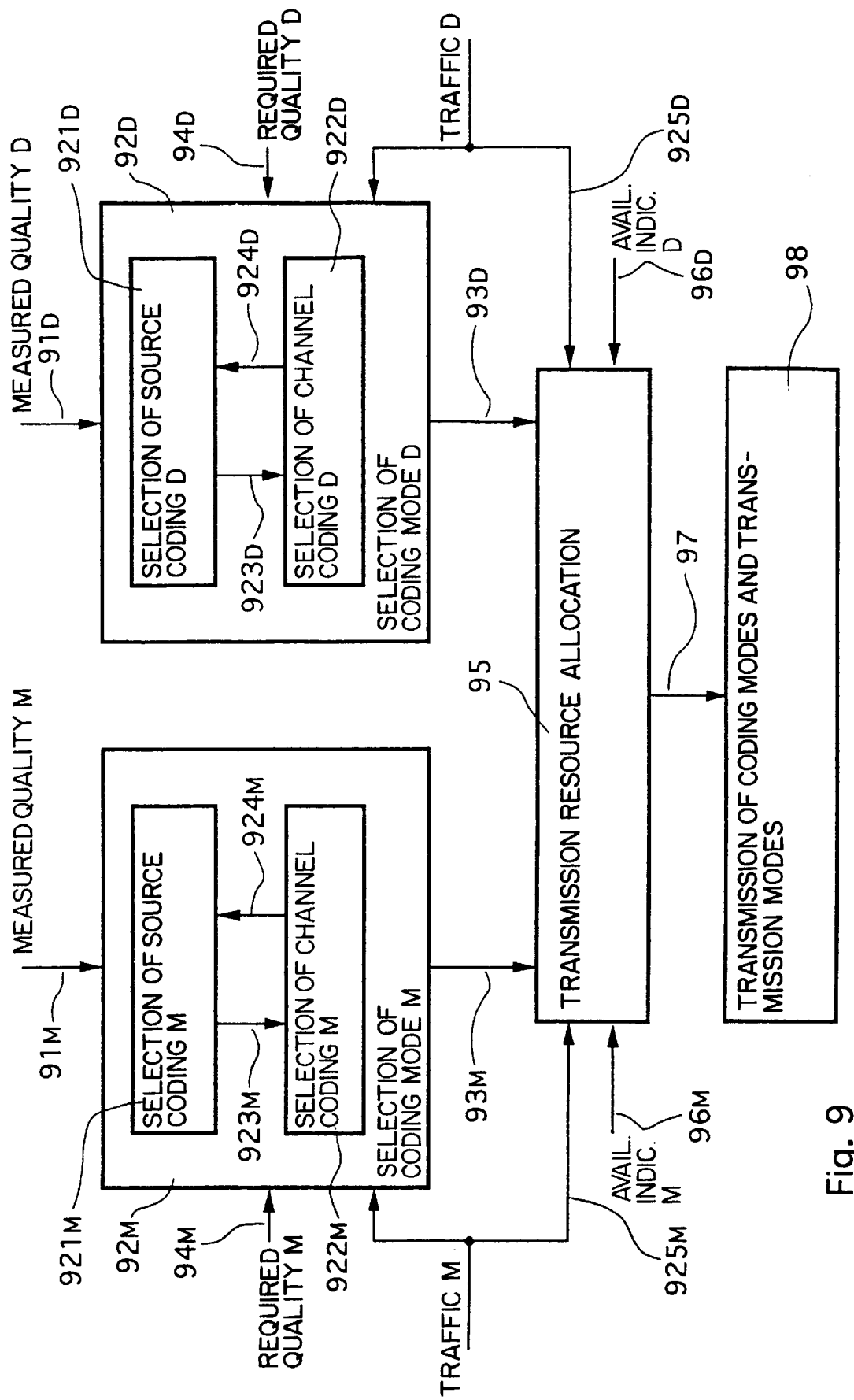
FIG. 9 is a block diagram showing the general principle of the invention.

FIG. 9 shows the main features of the method of the invention. In FIG. 9, reference numbers relating to the uplink transmission direction have the suffix M and those concerning the downlink direction have the suffix D.

As clearly shown in this figure, coding is optimized independently for each transmission direction. To this end, two separate quality measurements 91M and 91D are effected for each transmission direction (as already indicated, transmission quality can be very different from one direction to the other).

Then, for each direction, a coding mode 93M, 93D is selected (92M, 92D) in accordance with the measured quality indicator 91M, 91D, a traffic load indicator 925M, 925D and, where applicable, a required transmission quality 94M, 94D.

The coding mode is chosen (92M, 92D) in two stages:
a source code is chosen (921M, 921D),
a channel code is chosen (922M, 922D).

In the case of data, the expression "source code" naturally corresponds to the user bit rate concept.

The above two-fold choice is made, for example, to limit the bit rate and to optimize coding quality, in accordance with the characteristics of the transmission channel.

The two choices are naturally not independent. To the contrary, a coding mode is chosen that corresponds to a user bit rate (source coding) and a given channel code, as shown by the arrows 923M, 923D, 924M, 924D.

The coding modes may be chosen in either station. In all cases, each station measures the quality of the received signal one or more times and then chooses the coding mode or transmits the measurement(s) to the other station so that the latter can make the corresponding choice.

The method further includes an additional step 95 of transmission resource allocation.

The allocation 95 is made in such manner as to enable the transmission of information coded in the coding mode 93M, 93D selected on the basis of the availability indicators 96M, 96D, of course, and again with the objective of limiting the resource used.

If the system requires symmetrical resource allocation, it allows for the coding mode 93M, 93D having the highest raw bit rate.

The choice of coding mode is then transmitted to the other station so that it can adapt its coding and/or its decoding accordingly.

The method of the invention can also take into account traffic information 925M and 925D in choosing the coding mode and/or the transmission mode, especially if the user bit rate is variable (in particular for data services).

The coding and transmission mode(s) 97 selected are then transmitted (98) to the other station, so that the latter can adapt its coding and/or its decoding accordingly.

Figure 2:
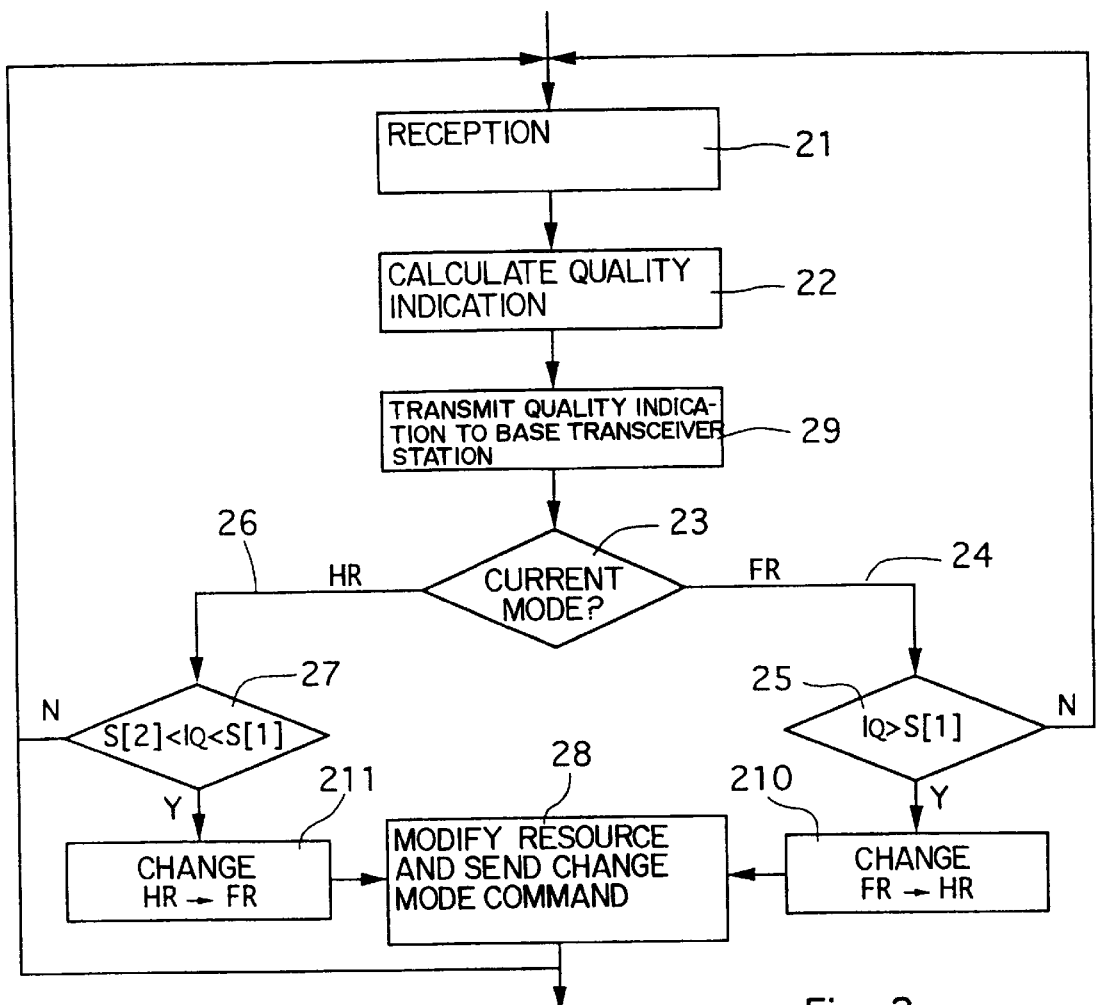
FIG. 2 shows a first embodiment of the invention in the case of a double unidirectional call, each transmission direction being managed independently.

Various embodiments of the invention can therefore be envisaged, depending on the type of system concerned. FIG. 2 shows a first embodiment of the invention in which each transmission direction is managed independently (double unidirectional call) and in which two transmission modes are available for a constant user bit rate.

This is the most simple case since there is no particular problem with resource asymmetry. FIG. 2 shows the processing carried out in the master station (base transceiver station or mobile station) if the call concerns exchange of data.

In each station (base transceiver station and mobile station) a transmitted signal is received (21) and then its quality Q is determined (22) by a method that is known in itself. There are many indicators of signal quality, some of which are already calculated in the stations for other purposes. They include the following criteria:
the bit error rate (BER) of the received signal,
the power of the received signal,
the distance between the mobile station and the base transceiver station,
an estimate of the impulse response of the transmission channel,
the time alignment,
the signal to noise ratio,
the C/I ratio.

More than one of these criteria can naturally be considered in order to refine the analysis.

The mobile station transmits (29) the quality information to the base transceiver station which takes the decisions for each transmission direction.

The system provides at least two transmission modes, for example the full rate (FR) mode and the half rate (HR) mode, corresponding to different channel coding qualities (coding efficiency). It is possible to change mode during transmission for each transmission direction, according to the value $I_Q$.

The following comparisons are therefore made, depending on the current transmission mode (23):
if the transmission mode is the full rate mode 24 and the quality IQ is above a predefined threshold S[1] (25), it is possible to change to the half rate mode (210); this limits the bit rate whilst assuring sufficient transmission quality;
if the transmission mode is the half rate mode 26 and the quality IQ is above a threshold S[2] (27), it is desirable to change (211) to the full rate mode to maintain reception quality.

In the case of a speech signal, the two modes considered can be the half rate mode (in the sense defined in the GSM standard) and the overprotected half rate mode (corresponding to the use of a speech encoder corresponding to the half rate mode with channel encoding made more robust, so that the resource occupied is one time slot in every frame). A single threshold is then used (there are no multiple quality levels).

If the outcome of one of the tests 25 and 26 is positive, a change mode command is sent (28) to the mobile station and the resource is modified accordingly. Otherwise, no change is effected.

The transmission 28 of a command can of course take into account many other criteria and in particular the available resource. It can also incorporate a time-delay to avoid incessant changes.

It is advantageous to provide the facility to require a given quality level (from at least two candidates) at initialization of the call, possibly different for the two transmission directions. In this case, as many thresholds Qi as necessary are defined.

Figure 10:
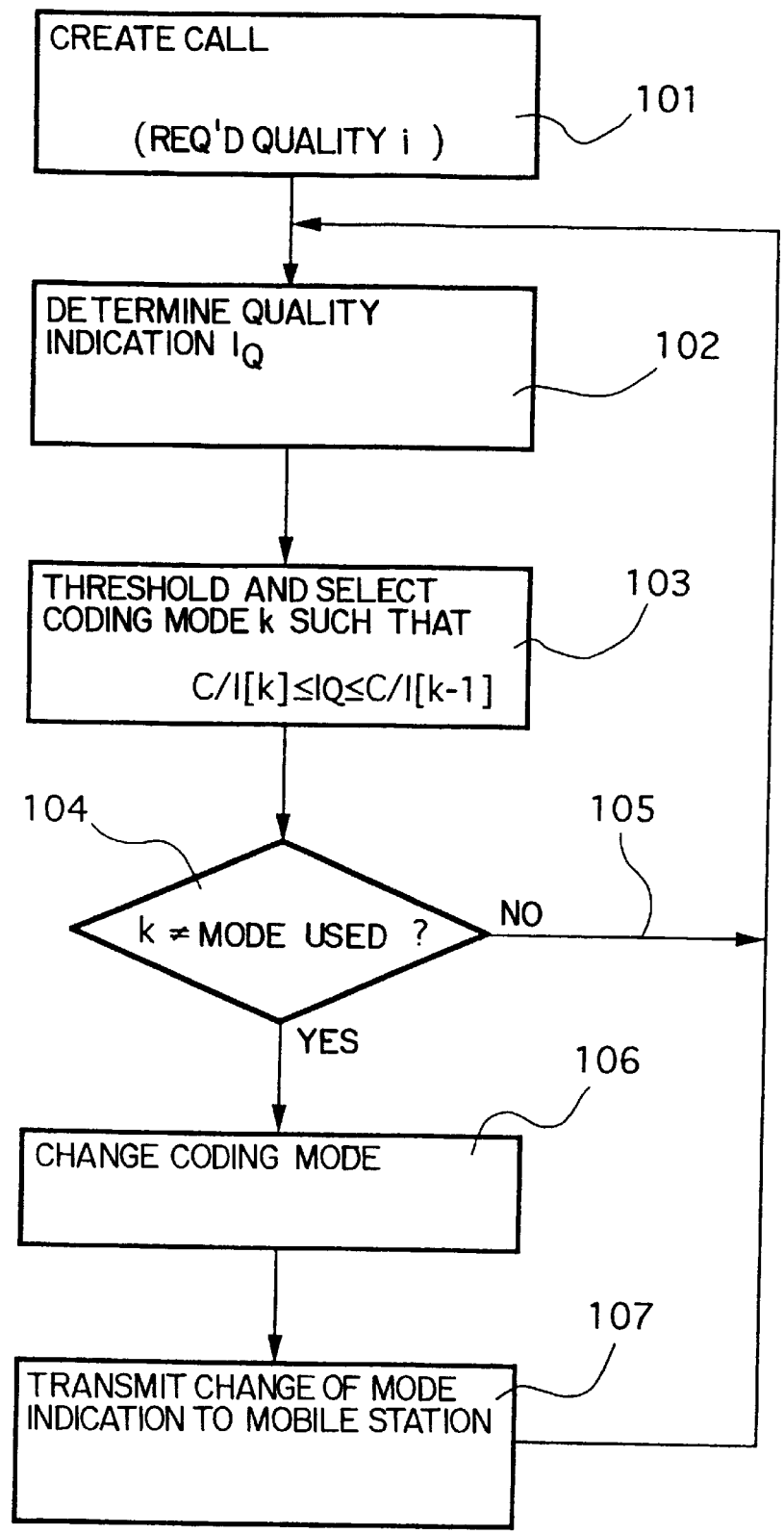
FIG. 10 shows one embodiment of the method of the invention generalizing the FIG. 2 embodiment to the selection of the coding mode from n coding modes.

Thus FIG. 10 shows the generalization of the FIG. 2 situation to n unidirectional modes (for constant user bit rate data services or speech).

After the call is created (101) with a quality level i chosen from n possible levels, a quality indicator $I_Q$ is determined regularly (102), or obtained from the other station, after which $I_Q$ is compared (103) to a series of thresholds Si. For example, if the quality criterion is C/I, $I_Q$ is compared to C/I[i] and the coding mode k is selected such that:

$C/I[k] \leq I_Q \leq C/I[k-1]$

If the coding mode k is that already selected (104) no processing is done (105). Otherwise, the required change of coding mode is effected (106), after which the change of mode information is transmitted (107) to the other station.

Note that the quality information $I_Q$ may be expressed in terms other than the transmission quality of the service. For data, for example, it may be expressed in terms of the bit error rate (BER) and the decision can be based on the distance.

Of course, the order of the thresholds may be reversed, for example if the criterion chosen is the distance. For a relatively long distance, quality is statistically worse and a more robust coding mode is needed. For a relatively short distance, on the other hand, the C/I ratio is statistically greater, and is characteristic of a favorable situation.

In the case of data services for which the user bit rate may vary, it is necessary to accept a variable information transmission time-delay. On the other hand, the information must be received with at least a minimum quality. There may therefore be a series of modes corresponding to a variable user bit rate with a constant or variable raw bit rate, the latter implying a variable resource. This introduces different transmission times for the same quantity of information transmitted.

It is possible to change mode on the basis of the channel quality but also on the basis of the traffic load of the network. For each user bit rate there will be a series of modes corresponding to a different resource. This amounts to adding a dimension for the classification of the modes. The mode assuring the required quality will be selected from the coding modes leading to the use of a particular resource in accordance with the traffic load.

The traffic load may be expressed in terms of the number of time slots used in the cell, which is known to the base transceiver station.

In a variant of this method, it is possible to transmit the quality information systematically, the receiver then taking the decision to change modes for itself. This technique simplifies the verification of resource availability. On the other hand, it requires the transmission of information indicating the mode used.

In many mobile radio systems, and in the GSM system in particular, resource allocation is symmetrical: the same quantity of resource must be allocated to each transmission direction.

In this case, the transmission mode change (in the usual sense of this expression) is possible only when it is acceptable or necessary in both transmission directions. However, the invention proposes a new mode, for data, called the modified mode, which is based on a novel, two-level approach: coding changes in each transmission direction and mode changes.

In the case of speech, a similar approach can be adopted, substituting "overprotected half rate" for all references to "full rate".

Figure 3A:
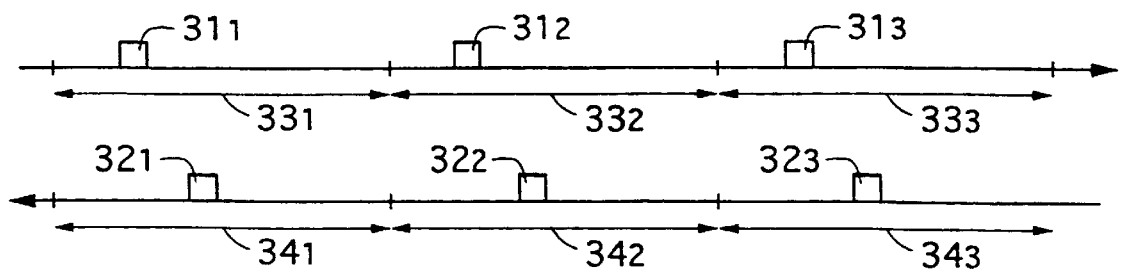
FIGS. 3A through 3C show the three modes of data transmission used an advantageous embodiment of the invention, respectively corresponding to the full rate and half rate modes that are known in themselves and the new mode of the invention, known as the modified half rate mode.
Figure 3B:
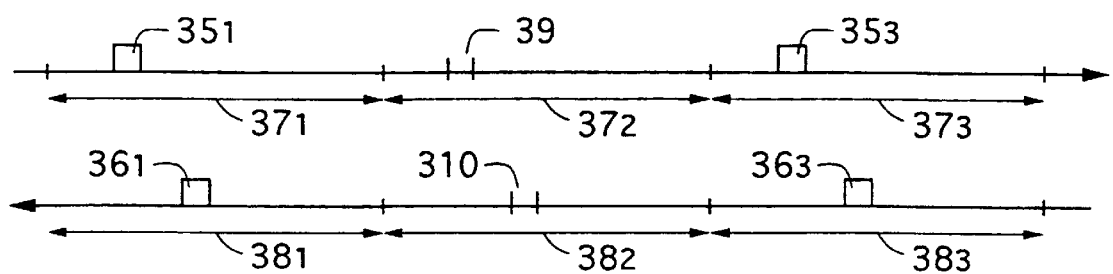
Figure 3C:
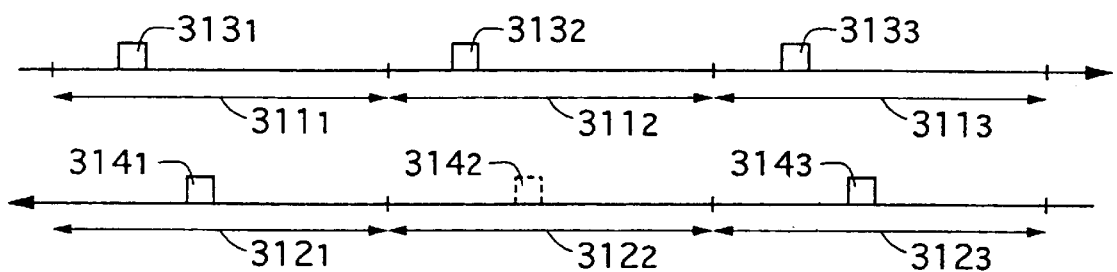

FIGS. 3A through 3C show the three possible modes in the situation in which two bidirectional transmission modes (full rate and half rate) are available for a data service at a constant user bit rate. Various other modes on the same model can naturally be defined.

FIG. 3A shows the full rate mode known in itself in which a time slot 31$i$, 32$i$ is associated with each frame 33$i$, 34$i$ in each transmission direction.

In this transmission mode the data is coded using a first channel code that corresponds to a bit rate of 22.8 kbit/s (in the GSM system).

FIG. 3B shows the second mode that is known in itself, the half rate mode, corresponding to a second channel code and a bit rate of 11.4 kbit/s. The first and second codes can correspond to two different error correcting code rates, for example.

In this second mode, a time slot 35$i$, 36$i$ is allocated to the call only in one frame in two 37$_1$, 37$_3$, 38$_1$, 38$_3$. In the intermediate frames 37$_2$, 38$_2$, the corresponding time slot 39, 310 can be allocated to another call.

FIG. 3C shows the modified half rate mode of the invention. This modified mode is used if the transmission channel allows the use of different channel codes in the two transmission directions. In this case, the same resource is allocated in the full rate mode (FIG. 3A): each frame 311$i$, 312$i$ includes a time slot 313$i$, 314$i$ for the call, but:

in a first direction, the first channel code is used and the time slots 313$i$ carry data, in a second direction, the second channel code is used, and corresponds to half the bit rate of the previous code, and data is transmitted only in one time slot 314$_1$, 314$_3$ in two; the slots 314$_2$ that are not used are either allocated to the transmission of asynchronous data or left empty to limit interference.

A system of this type that is known in itself therefore allows two types of service to be defined, corresponding to different qualities. The quality is expressed in terms of the output bit error rate (BER), for example. A service corresponds to the use of one transmission mode in both directions under conditions of operability (value of C/I or power level received Eb/No). In the GSM system, for example, the operability limit corresponds to C/I=9 dB.

The service implemented therefore belongs to a set {"high" quality service, "average" quality service}, respectively corresponding to a high bit rate and to a lower bit rate under normal conditions.

In accordance with the invention, it is possible to modify the transmission mode during a call with the two-fold objective of maintaining the required level of quality and limiting the quantity of information transmitted.

Figure 4A:
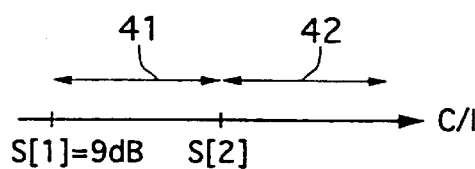
Figure 4B:
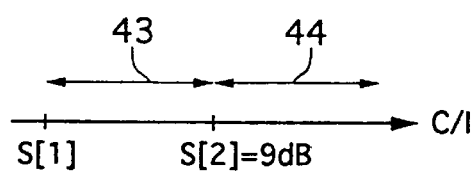

FIGS. 4A and 4B show the decision principle in the respective two types of quality, and therefore of service, and FIGS. 5A and 5B show the various operational possibilities.

FIG. 4A corresponds to the high quality level. If C/I is between S[2] (=9 dB) and S[1] (>9 dB) the full rate coding mode 41 is used. Beyond S[1] the half rate coding mode 42 is used. Below S[2] the call may be interrupted.

This makes it possible to distinguish between the four types of functioning shown in FIG. 5A, for a bidirectional call, when a high quality level is required:

51: C/I between 9 dB and S[1] in both directions: full rate mode in both directions, 52 and 53: C/I between 9 dB and S[1] in one direction and greater than S[1] in the other direction: full rate mode in one direction and modified half rate mode of the invention in the other direction, 54: C/I greater than S[1] in both directions: modified half rate mode in both directions, if the system does not provide for changing the allocation of resources during a call, or half rate mode in both directions if this change is possible.

FIG. 4B corresponds to the lower quality level. If C/I is between S[1] =9 dB and S[2], the full rate coding mode 43 is used. Beyond S[2] half rate coding 44 is used. Below S[2] the call may be interrupted.

This makes it possible to distinguish between the four types of functioning shown in FIG. 5B, when a high quality level is required:

55: C/I between S[2] and S[1] =9 dB in both directions: full rate mode in both directions,

56 and 57: C/I between S[2] and S[1] =9 dB in one direction and greater than S[1] =9 dB in the other direction: full rate mode in one direction and modified half rate mode of the invention in the other direction,

58: C/I greater than S[1] =9 dB in both directions: modified half rate mode in both directions, if the system does not provide for changing the allocation of resources during a call, or half rate mode in both directions if this change is possible.

FIG. 6 shows the variation in the bit error rate BER as a function of C/I for the full rate mode 61 and for the half rate or modified half rate mode 62.

C/I is the normal operability limit (C/I =9 dB, for example). The required quality levels Q1, Q2, respectively, define the thresholds S[1] and S[2] (where S[i] is a threshold for deciding to change from coding mode i to i+1 (i.e. half rate (i =1) to full rate (i =2)) and vice versa, for both types of service, of medium and high quality, respectively, equivalent to using the half rate and full rate modes, respectively, under normal operability conditions.

In the example described above the coding rates are in a ratio of 2:1. Any other ratio may naturally be chosen. Moreover, this principle can easily be generalized to a greater number n of coding modes.

Consider the case of n different coding modes, numbered from 1 through n, in order of increasing robustness, and therefore in order of possibly increasing allocated resource, and still assuming that the resource allocated is bidirectional: there are $n^2$ (n+(n(n−1))) bidirectional transmission modes. The first n modes correspond to the use of the same coding mode i in both directions. The (n(n−1)) other bidirectional modes correspond to the use of different coding modes.

In this latter case, the resource allocated is that required by the most demanding coding mode. Accordingly, if Ci denotes the codes and Mi the modes:

for $1 \leq i \leq n$: Mi corresponds to the code Ci in both directions;

for $n+1 \leq i \leq n^2$: Mi corresponds to the code Cl in one direction and the code Cm in the other direction, where l and m are obtained from the symmetrical matrix shown in FIG. 14.

The columns 141₁ through 141ₙ correspond to the selected coding mode in the uplink direction. The rows 142₁ through 142ₙ correspond to the coding mode in the downlink direction. This defines a notation for the n(n−1) transmission modes 143ᵢ.

The quality Qi is expressed in terms of the bit error rate for data services, for example. Qi can be expressed in terms of the Mean Opinion Score (MOS) for speech transmission services.

There are therefore at most n different services. There can be up to n data services, but for speech there is only one service and the aim is to extend the range of operability.

Figure 12:
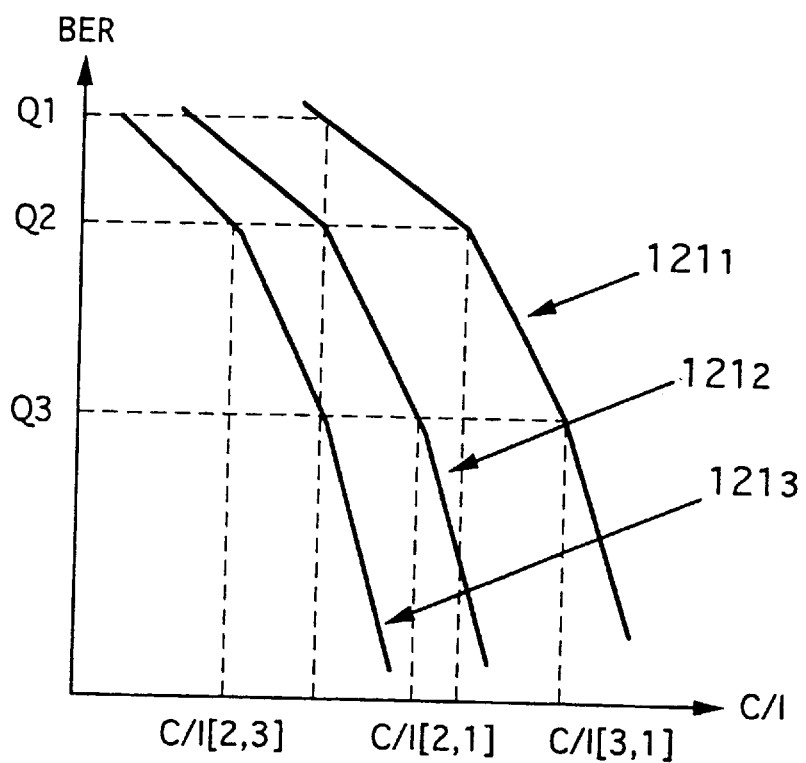
FIG. 12 is a generalization of FIG. 6 to the case of n coding modes corresponding to n channel codes for the data at constant user bit rate.

FIG. 12 is similar to FIG. 6 but shows n curves 121₁ through 121ₙ corresponding to the n codes in the case of fixed user bit rate data.

The thresholds C/I[i,j] are defined as minimal values of C/I enabling a code Cj to assure the quality Qi. In the present context, C/I[i,j] corresponds to the abscissa of the point on the curve giving the performance of the code i for an ordinate equal to Qi. For a so-called normal operability condition, C/I[i,i]=operability point =9 dB in the GSM system.

For speech transmission, in terms of MOS, the only difference is that the curves are inverted. This is because better quality corresponds to a better MOS.

Figure 11:
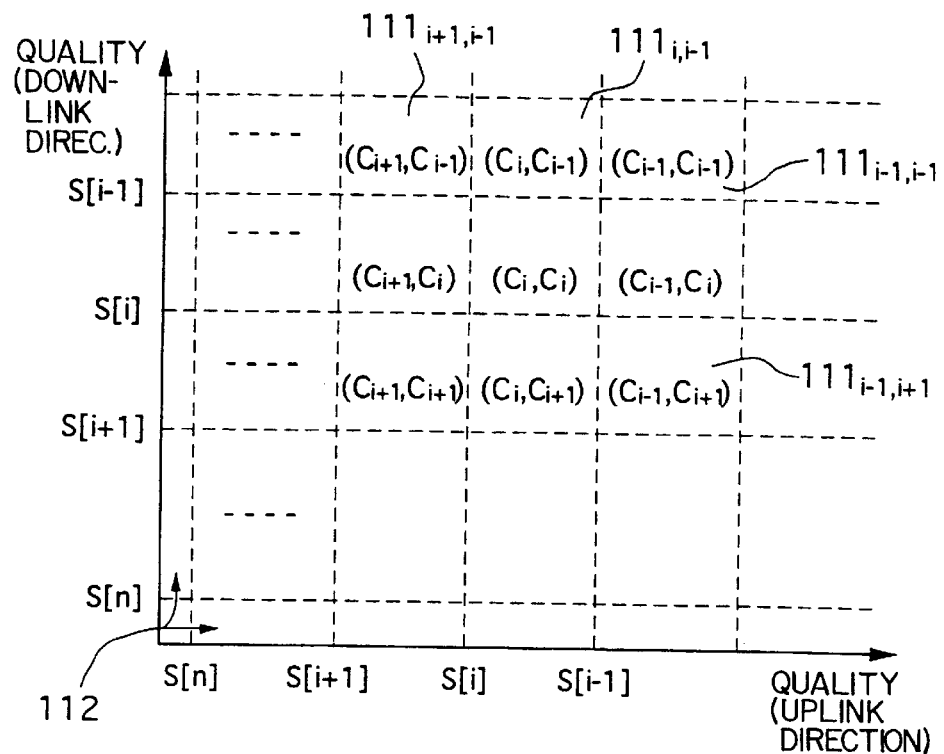
FIG. 11 shows the various possible bidirectional transmission modes when n codes are available in each transmission direction, in accordance with quality information.

FIG. 11 shows the various possibilities in this case (FIG. 11 is an extension of FIGS. 5A and 5B), for a given service i. The thresholds S[j] then correspond to C/I[i,j]. The robustness of the code increases for increasing values of n.

The n different thresholds S[i] to be considered are plotted on the abscissae and on the ordinates. The thresholds define areas 111ₖ,ₗ in which the combination (Ck, Cl) is indicated, where Ck is the coding mode to use in the uplink direction and Cl is the coding mode to use in the downlink direction.

Figure 14:
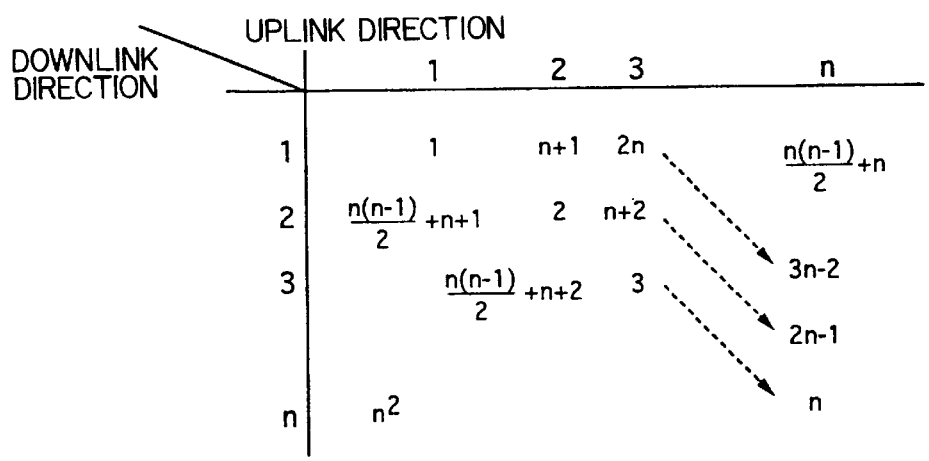
FIG. 14 shows in the form of a matrix one way of numbering the transmission modes of a system with n coding modes in each direction.

If k=l, the transmission mode k is selected (in the situation in which the system requires symmetrical allocation); otherwise, the FIG. 14 matrix is used to determine the bidirectional mode.

Below the threshold S[n] no call can be made (112).

The decisions to change mode are advantageously taken in only one of the two stations communicating, preferably the base transceiver station. These decisions can of course be taken in the mobile station, however.

FIG. 7 shows the means employed in a base transceiver station for n=2. The mode control means 71 determine the type of channel code to be used in the base transceiver station to mobile station direction, operating on the selector 72 by means of the command 73 to choose a channel encoder from the channel encoders 713₁ through 713ₙ, and in the mobile station to base transceiver station direction, by transmitting a change mode command 74 to the mobile station if necessary.

The control means 71 operate on the basis of a required quality indication 75, information 76 representative of the transmission quality in the mobile station to base transceiver station direction, obtained by analysis 77 of the received signal 78, and information 79 representative of the transmission quality in the base transceiver station to mobile station direction, extracted (710) from the data transmitted by the mobile station.

Figure 8:
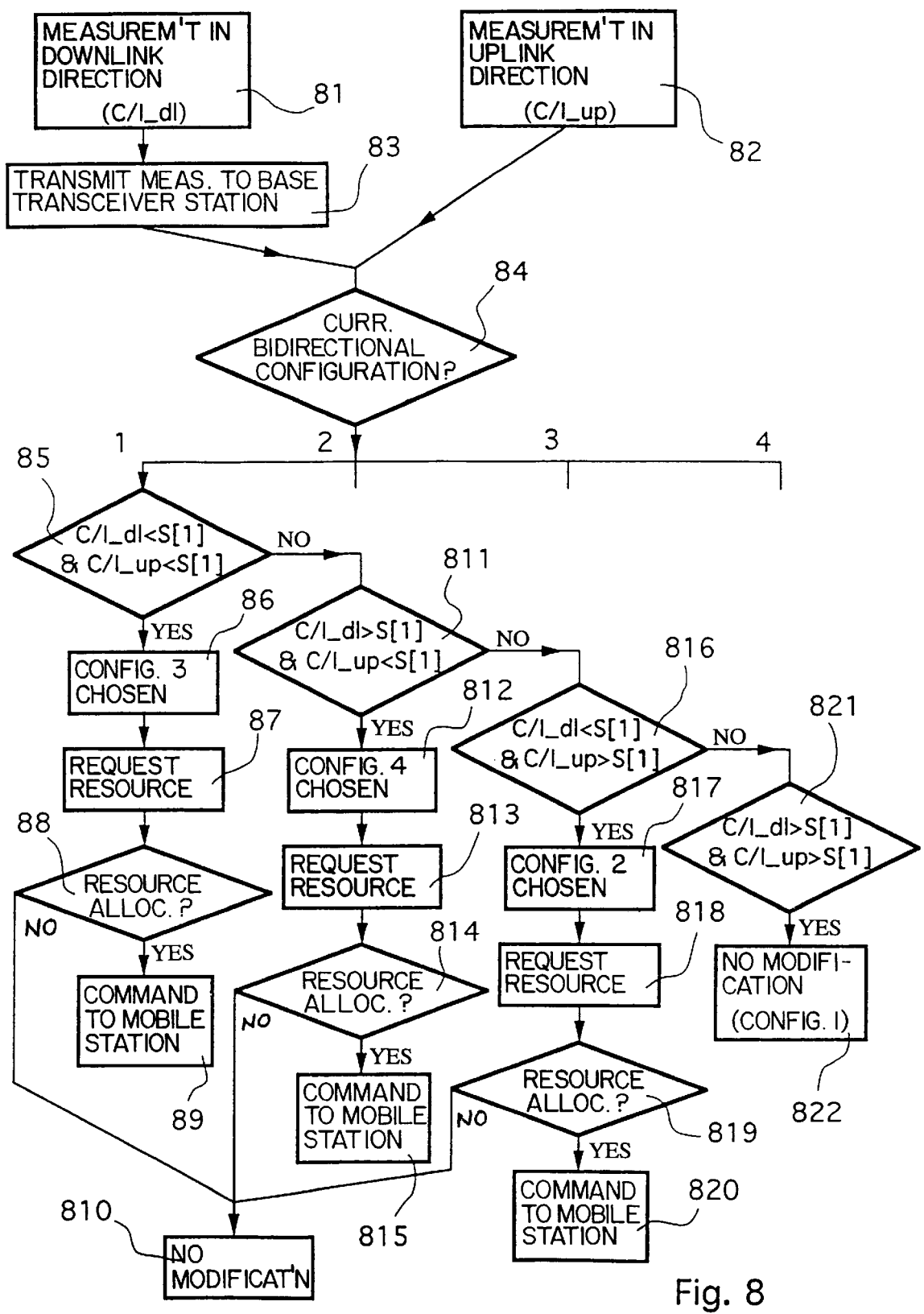
FIG. 8 shows the decision process used by the station from FIG. 7 in the case of n=2 modes.

The processing carried out by the module 71 is described in more detail below, with reference to FIG. 8.

It is clear that the same principle can be used to select a source code from a plurality of source codes, for example using the command 723.

The data 711 to be transmitted to the mobile station undergoes source coding 712 and then channel coding 713*i*, according to the position of the selector 72.

The codes 713*i* correspond to different coding rates, for example. If the coding mode selected for the uplink and downlink directions give different raw bit rates (which is automatically the case if a single speech encoder is used and if two different channel codes are employed), a so-called modified bidirectional transmission mode is used and the data coded for one transmission direction uses only part of the allocated resource. The base transceiver station can then authorize the transmission of asynchronous data in the time slots left free.

In the case of a system with two channel encoders corresponding to the transmission modes of FIGS. 3A and 3B, for example, the base transceiver station may include a signal shaper and transmitter module 717 which receives (for the call in question) either data 718 from a full rate channel encoder 713₁ or data 719 delivered by a selector 720 which delivers alternately data 72 produced by a channel coder 713ₙ and asynchronous data 722.

The change mode commands and the quality information are transmitted in the protocol data, for example. In the case of the GSM system, they can be placed in the ACCH or FACCH channels.

The decision process of the module 71 will now be described with reference to FIG. 8, in the case of two coding modes (this is readily generalizable, for example from FIG. 10).

The module effects (81) a measurement 84 of quality in the downlink direction (C/I_dl) and transmits (82) it to the base transceiver station. At the same time the base transceiver station effects (83) a measurement (85) of quality in the uplink direction (C/I_up). Four processes are considered, depending on which of the following bidirectional configurations is the current configuration:

1: half rate in both transmission directions,
2: full rate in both transmission directions,
3: modified half rate in the downlink direction and full rate in the uplink direction,
4: modified half rate in the uplink direction and full rate in the downlink direction.

Only the case corresponding to configuration 1, the most complex, is described.

The following operations are effected:

if C/I_dl<S[1] and C/I_up<S[1] (85) then choose configuration 2 (86); request necessary additional resource (87); if resource is allocated (88) then transmit (89) command to mobile station if not: no modification (810); if not if C/I_dl>S[1] and C/I_up<S[1] (811) then choose configuration 3 (812); request necessary additional resource (813); if resource is allocated (814) then transmit (815) command to mobile station if not: no modification (810); if not if C/I_dl<S[1] and C/I_up>S[1] (816) then choose configuration 4 (817); request necessary additional resource (818); if resource is allocated (819) then transmit (820) command to mobile station if not: no modification (810); if not if C/I_dl>S[1] and C/I_up>S[1] (821) then no modification (822).

If the initial configurations are 2, 3 or 4, the same bidirectional configuration choices are made, but the same resource is retained if configuration 1 is not chosen. If the latter is selected, the excess resource is released.

Figure 13:
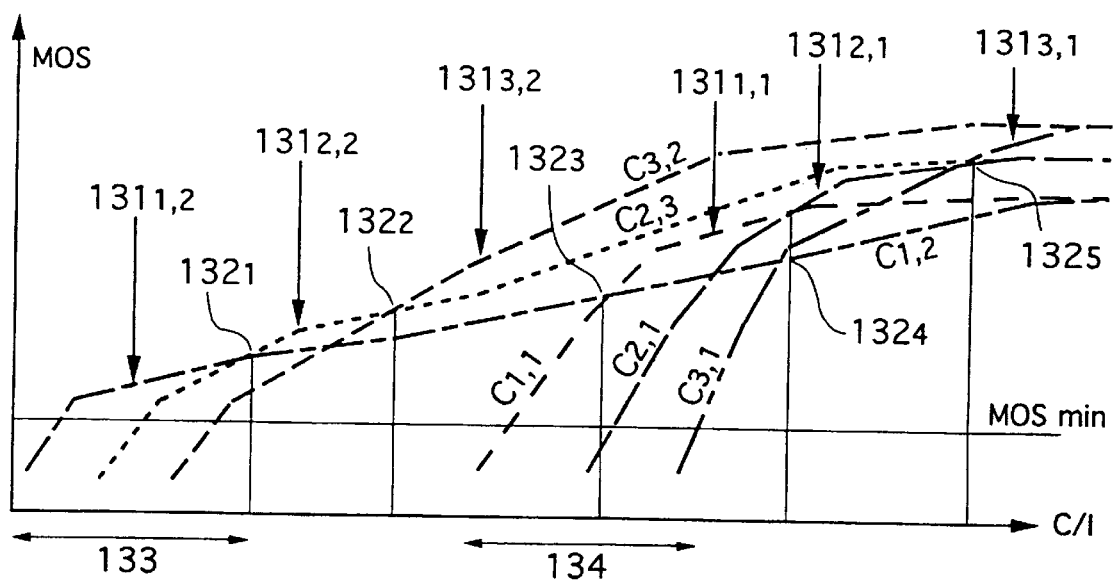
FIG. 13 shows graphs for the MOS performance of the various coding modes for speech (combination of two speech encoders and three channel encoders).

As already indicated, the invention also applies to the transmission of speech. As before, various situations can be encountered:

there is a series of transmission modes for which the user bit rate is variable but the raw bit rate is constant; the same radio resource is therefore always allocated; the mode may always be the same in both directions or the modes may be different but correspond to the same resource, there can be a series of transmission modes with a fixed user bit rate in accordance with the principle already described for data (in particular for half rate and overprotected half rate coding modes), in the most general case, there may be a series of coding modes that correspond to user and raw bit rates, and therefore to allocated resources, that are variable; the curves showing the performance in terms of MOS (Mean Opinion Score) of the various modes as a function of the signal to interference ratio (C/I) can be plotted, as shown in FIG. 13; the curves $131_{i,j}$ correspond to the codes i, j, where i relates to the raw bit rate and i to the channel coding rate. The value of i increases as the raw bit rate increases and the value of i increases as the robustness decreases. The codes 133 use two time slots per frame and the codes 134 use one time slot per frame.

In this latter case, there are two feasible mode change strategies:

Given the quality information, the mode chosen for each direction is the one that provides the best quality in terms of MOS without consideration as to the differences between the radio resources of the modes. The bidirectional resource corresponding to the more resource hungry mode of the two directions is then allocated. In the FIG. 13 example, $C_{3,1}$, $C_{3,2}$, $C_{1,2}$ would be used in succession for a C/I continuously deteriorating (certain modes are therefore not used). The mode change decision thresholds correspond to the intersections $132_1$ through $132_5$ between the curves corresponding to these various modes.

Given the quality information, the less resource hungry mode is chosen for each direction, which assures the required quality and provides the best quality relative to the other equally resource hungry modes. In the FIG. 13 example the modes $C_{3,1}$, $C_{2,1}$, $C_{1,1}$, $C_{3,2}$, $C_{2,2}$, $C_{1,2}$ would be used in succession for a C/I continuously deteriorating. This means that as C/I deteriorates, the resource is changed only if there is no other way to assure the required quality. If C/I improves, the mode is changed for the less resource hungry mode to assure the required quality of service. The decision thresholds can correspond to the intersections between the curves of the modes used mentioned above.

In both cases n modes that can be renumbered $C_i(i=1, \ldots, n)$ and n quality thresholds $S_i(i=1, \ldots, n)$ are used, which may be illustrated by a graph identical to that in FIG. 11.

The only difference compared to the case already dealt with is that two modes with different suffixes do not systematically correspond to a different resource and this leads to a modified mode only if the raw bit rate is different.

The same type of algorithm can be used as described with reference to FIG. 10. Two series of thresholds can therefore be provided according to whether a change to a more robust or a less robust mode to avoid "ping-pong" effects is anticipated.

What is claimed is:

1. A method of adapting the air interface in a mobile radio system enabling exchange of data in the form of bidirectional digital signals between at least one mobile station and at least one base transceiver station, said method comprising the steps of:

providing the system with at least two coding modes, each mode corresponding to a predetermined source code and a predetermined channel code for the transmission of a wanted signal for each transmission direction, and each source code corresponding to a given user bit rate and each channel code corresponding to a given coding efficiency and therefore to a given total bit rate for a given source code;

at the time of a call between a mobile station and a base transceiver station, making two separate analyses of transmission quality for each transmission direction, respectively;

for each transmission direction, selecting one of said coding modes in accordance with the corresponding transmission quality analysis; and allocating a quantity of transmission resource for each transmission direction in accordance with said analyses of transmission quality and the available transmission resource;

wherein transmission resource allocation is symmetrical for each transmission direction, wherein more transmission resource is allocated if the coding mode selected in at least one transmission direction corresponds to a total bit rate incompatible with the resource allocated in the current transmission mode and the additional transmission resource required is available, and wherein less transmission resource is allocated if the coding modes selected in the two transmission directions correspond to total bit rates compatible with said allocation.

2. A method of adapting the air interface in a mobile radio system enabling exchange of data in the form of bidirectional digital signals between at least one mobile station and at least one base transceiver station, said method comprising the steps of:

providing the system with at least two coding modes, each mode corresponding to a predetermined source code and a predetermined channel code for the transmission of a wanted signal for each transmission direction, and each source code corresponding to a given user bit rate and each channel code corresponding to a given coding efficiency and therefore to a given total bit rate for a given source code;

at the time of a call between a mobile station and a base transceiver station, making two separate analyses of transmission quality for each transmission direction, respectively;

for each transmission direction, selecting one of said coding modes in accordance with the corresponding transmission quality analysis; and allocating a quantity of transmission resource for each transmission direction in accordance with said analyses of transmission quality and the available transmission resource;

wherein at least one modified transmission mode is defined in which the resource allocated to at least one transmission direction is greater than the resource needed to transmit information coded in the selected coding mode, said coded information being divided between a fraction of the time slots corresponding to said allocated resource.

3. The method claimed in claim 2 wherein the time slots not used by said call do not carry any signal.

4. The method claimed in claim 2 wherein the time slots not used by said call are assigned to the transmission of asynchronous data signals.

5. The method claimed in claim 2, wherein said system provides at least two transmission modes including:

a first transmission mode corresponding to a first quality level whereby said data is transmitted at the rate of one time slot every signal frame in both transmission directions, and a second transmission mode corresponding to a second quality level below said first quality level whereby said data is transmitted at the rate of one time slot every two signal frames in both directions; and wherein said at least one modified transmission mode consists of:

transmitting information coded in a first coding mode in a first transmission direction at the rate of one time slot every signal frame, and transmitting information coded in a second coding mode in a second transmission direction at the rate of one time slot every two signal frames, the resource allocated to the call in each of the two transmission directions corresponding to the resource needed to transmit data in the first coding mode.

6. A method of adapting the air interface in a mobile radio system enabling exchange of data in the form of bidirectional digital signals between at least one mobile station and at least one base transceiver station, said method comprising the steps of:

providing the system with at least two coding modes, each mode corresponding to a predetermined source code and a predetermined channel code for the transmission of a wanted signal for each transmission direction, and each source code corresponding to a given user bit rate and each channel code corresponding to a given coding efficiency and therefore to a given total bit rate for a given source code;

at the time of a call between a mobile station and a base transceiver station, making two separate analyses of transmission quality for each transmission direction, respectively; and for each transmission direction, selecting one of said coding modes in accordance with the corresponding transmission quality analysis;

wherein the transmission quality analysis consists in determining at least one of the following:

the bit error rate of the received signal, the power of the received signal, the distance between the mobile station and the base station, an estimate of the impulse response of the transmission channel, the time alignment, the signal to noise ratio, the signal to interference ratio, the traffic load.

7. A method of adapting the air interface in a mobile radio system enabling exchange of data in the form of bidirectional digital signals between at least one mobile station and at least one base transceiver station, said method comprising the steps of:

providing the system with at least two coding modes, each mode corresponding to a predetermined source code and a predetermined channel code for the transmission of a wanted signal for each transmission direction, and each source code corresponding to a given user bit rate and each channel code corresponding to a given coding efficiency and therefore to a given total bit rate for a given source code;

at the time of a call between a mobile station and a base transceiver station, making two separate analyses of transmission quality for each transmission direction, respectively; and for each transmission direction, selecting one of said coding modes in accordance with the corresponding transmission quality analysis;

wherein the selection of a coding mode includes a step of comparing information representative of transmission quality with at least one predetermined threshold;

wherein said information representative of quality is compared to different thresholds according to the required quality level for the call in progress.

8. The method claimed in claim 7 wherein said thresholds are predetermined values of the signal to interference ratio.

9. The method claimed in claim 8 wherein a system operability threshold is defined and:

for at least a first higher quality type of service said quality information is compared with a first threshold higher than said operability threshold, and for at least a second lower quality type of service said quality information is compared with a second threshold lower than said operability threshold.

10. A method of adapting the air interface in a mobile radio system enabling exchange of data in the form of bidirectional digital signals between at least one mobile station and at least one base transceiver station, said method comprising the steps of:

provviding the system with at least two coding modes, each mode corresponding to a predetermined source code and a predetermined channel code for the transmission of a wanted signal for each transmission direction, and each source code corresponding to a given user bit rate and each channel code corresponding to a given coding efficiency and therefore to a given total bit rate for a given source code;

at the time of a call between a mobile station and a base transceiver station, making two separate analyses of transmission quality for each transmission direction; respectively, and for each transmission direction, selecting one of said coding modes in accordance with the corresponding transmission quality analysis;

wherein the selection of a coding mode includes a step of comparing information representative of transmission quality with at least one predetermined threshold, and wherein two sets each of at least one threshold are defined, the first set being used if the measured transmission quality deteriorates and the second set being used if the measured transmission quality improves.

11. A method of adapting the air interface in a mobile radio system enabling exchange of data in the form of bidirectional digital signals between at least one mobile station and at least one base transceiver station, said method comprising the steps of:

providing the system with at least two coding modes, each mode corresponding to a predetermined source code and a predetermined channel code for the transmission of a wanted signal for each transmission direction, and each source code corresponding to a given user bit rate and each channel code corresponding to a given coding efficiency and therefore to a given total bit rate for a given source code;

at the time of a call between a mobile station and a base transceiver station, making two separate analyses of transmission quality for each transmission direction, respectively; and for each transmission direction, selecting one of said coding modes in accordance with the corresponding transmission quality analysis; and wherein the decision to change coding mode and/or transmission mode is taken in said base transceiver station, said mobile station transmitting to said base transceiver station information representative of transmission quality in the base transceiver station to mobile station direction and said base transceiver station transmitting to said mobile station information representative of said decision.

12. A method of transmitting modified data in a mobile radio system enabling bidirectional exchange of data between at least one mobile station and at least one base transceiver station, said method comprising the steps of:

providing the system with at least two transmission modes, a first transmission mode corresponding to at least one first coding mode and necessitating a first allocation of resource in each transmission direction, and a second transmission mode corresponding to at least one second coding mode and necessitating a second allocation of resource, less than said first allocation of resource, in each transmission direction;

transmitting data coded in one of said first coding modes in a first transmission direction;

transmitting data coded in one of said second coding modes in a second transmission direction;

causing the resource allocated to the call in each transmission direction to correspond to the resource allocated in accordance with said first transmission mode; and transmitting in the second transmission mode by using only a part of the available transmission resource.

13. A base transceiver station of a mobile radio station using a method of adapting the air interface in a mobile radio system enabling exchange of data in the form of bidirectional digital signals between at least one mobile station and at least one base transceiver station, said method comprising the steps of: providing the system with at least two coding modes, each mode corresponding to a predetermined source code and a predetermined channel code for the transmission of a wanted signal for each transmission direction, and each source code corresponding to a given user bit rate and each channel code corresponding to a given coding efficiency and therefore to a given total bit rate for a given source code; at the time of a call between a mobile station and a base transceiver station, making two separate analyses of transmission quality for each transmission direction, respectively; for each transmission direction, selecting one of said coding modes in accordance with the corresponding transmission quality analysis;

said base transceiver station comprising:

means for determining at least a first indication representative of transmission quality in the mobile station to base transceiver station direction, means for receiving a second indication representative of transmission quality in the base transceiver station to mobile station direction, means for modifying the coding mode and/or the transmission mode in each transmission direction in accordance with said first and second indications, and means for transmitting to said mobile station information representative of the coding and/or transmission modes selected.

14. A mobile station of a mobile radio system implementing a method of adapting the air interface in a mobile radio system enabling exchange of data in the form of bidirectional digital signals between at least one mobile station and at least one base transceiver station, said method comprising the steps of: providing the system with at least two coding modes, each mode corresponding to a predetermined source code and a predetermined channel code for the transmission of a wanted signal for each transmission direction, and each source code corresponding to a given user bit rate and each channel code corresponding to a given coding efficiency and therefore to a given total bit rate for a given source code; at the time of a call between a mobile station and a base transceiver station, making two separate analyses of transmission quality for each transmission direction, respectively; for each transmission direction, selecting one of said coding modes in accordance with the corresponding transmission quality analysis;

said mobile station comprising:

means for determining at least one indication representative of transmission quality in the base transceiver station to mobile station direction, means for transmitting said indication to said base transceiver station, and means for receiving an indication representative of the coding and/or transmission modes selected.

* * * * *